(12) United States Patent
Hashimoto

(10) Patent No.: US 9,360,261 B2
(45) Date of Patent: Jun. 7, 2016

(54) METHOD AND SYSTEM FOR CONDITIONING AIR

(71) Applicant: SHINWA CONTROLS CO., LTD., Kanagawa (JP)

(72) Inventor: Nobuyoshi Hashimoto, Kanagawa (JP)

(73) Assignee: Shinwa Controls Co., Ltd., Kanagawa (JP)

( * ) Notice: Subject to any disclaimer, the term of this patent is extended or adjusted under 35 U.S.C. 154(b) by 670 days.

(21) Appl. No.: 13/676,603

(22) Filed: Nov. 14, 2012

(65) Prior Publication Data

US 2013/0139996 A1 Jun. 6, 2013

(30) Foreign Application Priority Data

Nov. 18, 2011 (JP) .................. 2011-252975

(51) Int. Cl.
| | |
|---|---|
| F28F 27/00 | (2006.01) |
| F24F 11/00 | (2006.01) |
| F24F 3/044 | (2006.01) |
| F24F 3/16 | (2006.01) |

(52) U.S. Cl.
CPC ................. *F28F 27/00* (2013.01); *F24F 3/044* (2013.01); *F24F 3/161* (2013.01); *F24F 11/0008* (2013.01); *F24F 11/0012* (2013.01); *F24F 11/0015* (2013.01); *F24F 2011/0075* (2013.01); *Y02B 30/767* (2013.01)

(58) Field of Classification Search
None
See application file for complete search history.

(56) References Cited

U.S. PATENT DOCUMENTS

| | | | | |
|---|---|---|---|---|
| 4,730,772 | A | * | 3/1988 | Lortie et al. ................. 236/44 R |
| 2008/0098756 | A1 | * | 5/2008 | Uselton ................... F24F 3/153 |
| | | | | 62/173 |

FOREIGN PATENT DOCUMENTS

JP     A-2004-028421     1/2004

* cited by examiner

*Primary Examiner* — Mohammad Ali
*Assistant Examiner* — Saad M Kabir
(74) *Attorney, Agent, or Firm* — Crowell & Moring LLP

(57) ABSTRACT

An air conditioning method that reduces the amount of cooling energy and the amount of dehumidification energy to approximately a limiting amount, and also reduces the amount of humidifying energy to approximately a limiting amount. If an absolute humidity of the process air is calculated by use of measurements of changes in work conditions and variations in atmospheric pressure, the required amount of air to be cooled and dehumidified flowing downstream through the main-stream duct and the required amount of humidification can be determined. Therefore, by outputting a signal indicative of the required amount of cooled-dehumidified air to actuate a controller of flow-rate regulating means, and outputting a signal indicative of the required amount of humidification to actuate a controller of humidifying means, the amount of air to be cooled and dehumidified can be reduced to the required amount of cooled-dehumidified air close to the limiting amount.

4 Claims, 3 Drawing Sheets

Related Art

METHOD AND SYSTEM FOR CONDITIONING AIR

BACKGROUND

1. Technical Field

The present invention relates to an air conditioning system and an air conditioning method including the steps of: passing a required flow of air intended to be cooled and dehumidified as a main stream through cooling dehumidifying means to cool and dehumidify the air; passing the air through heating means to regulate the air to a predetermined temperature; passing the air through humidifying means to regulate the air to a predetermined humidity; and then merging the air with the reminder of the process air as a side stream so that the air is regulated to a predetermined amount of supply air to be supplied to a use point where industrial activity is carried out.

2. Related Art

The air conditioning systems having the functions of cooling and dehumidifying cools the process air taken in from the outdoors and/or the indoors to its dew point or lower during the passage of the process air through a cooling dehumidifier so that moisture in the process air is condensed to be separated as condensed water. Then, the process air is heated to a predetermined temperature with accuracy and humidified to a predetermined humidity with accuracy to result in the heating-regulated and humidity-regulated air to be supplied to a cleanroom, a clean booth or a clean chamber. Such systems are widely used in manufacturing industries such as semiconductors, various electronic components and various precision components, food industries, pharmaceutical industries, printing industries and the like.

In typical methods of conditioning air which are adopted for cleanrooms, air taken in from the outside of the system is cleaned of fine particles such as dust, mist and the like, and also the temperature and humidity of the air are regulated. Then, the air is uninterruptedly supplied into the cleanroom as supply air, and also the same amount of indoor air as the amount of the supply air is discharged to the outside of the system.

However, the air discharged to the outside of the system is of a temperature and a humidity which have been regulated by use of energy. From the viewpoint of recent energy conservation needs, the structure is modified to be capable of reducing the amount of discharged air as low as possible and regulating the temperature and the humidity of the air expelled from the clean room to allow the recycled use of the air.

In particular, the recent social situation more strongly requires energy conservation. Because of this, in the case of using a refrigerant evaporator in a refrigeration cycle to provide cooling and dehumidification in the related art, as illustrated in FIG. 2, the refrigeration cycle is made up of a compressor 14, an oil separator 16, a condenser 17, an electronic expansion valve 18, cooling dehumidifying means 1, an accumulator 20 and the like that are interconnected by pipes to circulate the refrigerant. Further, air is taken in through an air inlet port 30a of an introducing duct 30, and then is divided into a main-stream duct 37 and a side-stream duct 38. This process air is divided around the ratio of 1 to 1 to flow downstream respectively in the main-stream duct and the side-stream duct in order to reduce the consumption of the cooling and dehumidification energy in the cooling dehumidifying means 1. A process-air flow velocity sensor 34, a process-air temperature sensor 35 and a process-air relative humidity sensor 36 are provided in the introducing duct 30 to measure the flow velocity, the temperature and the relative humidity of the process air taken in, and inputs the measurements to arithmetic means 26.

The cooling dehumidifying means 1 is accommodated in the main-stream duct 37, while flow-rate regulating means 50 is placed in the side-stream duct 38. The flow-rate regulating means 50 is equipped with a flow-rate regulating means actuator 51 for adjustment to the degree of opening of the side-stream duct to maintain constant flow ratio between the main stream and the side stream of the process air flowing downstream in the respective ducts. A side-stream flow velocity sensor 40 is placed in the side-stream duct 38 to measure the flow velocity of the process air flowing in the side-stream duct 38. The measurement is sent to the arithmetic means 26. The main-stream duct 37 and the side-stream duct 38 merge together at the downstream of the cooling dehumidifying means 1 to form a merging duct 39 into which the process air flows.

Heating means 2, humidifying means 3 and a supply-air fan 11 are placed downstream of the confluence. In the air conditioning system shown in FIG. 2, approximately one-half of the overall process air flows into the main-stream duct 37 from the direction of the left arrow, and then is cooled and dehumidified in the cooling dehumidifying means 1. That is, the process air flowing through the main-stream duct 37 is cooled to its dew point or lower during the passage through the cooling dehumidifying means 1, so that the water is separated as condensed water and then discharged to the outside of the air conditioning system. The process air is dehumidified and the temperature of the process air flowing out from the cooling dehumidifying means 1 is measured at a dehumidified air temperature sensor 23.

The air flowing into the cooling dehumidifying means 1 is heat-exchanged with the refrigerant circulating in the refrigeration cycle, so that the air transfers its heat of evaporation to the refrigerant via a heat exchanger tube to be cooled to its dew point or lower. Because the process air taken in is cooled and dehumidified in this manner, passing the process air through the heating means 2 and the humidifying means 3 allows the process air to be regulated to a predetermined temperature and a predetermined humidity. Thus, the process air results in a supply air available in use point. The temperature of the air after the passage through the heating means 2 is measured by a heated air temperature sensor 24.

For a change in the amount of heat required for cooling and the amount of heat required for dehumidification in the cooling dehumidifying means 1, that is, the amount of heat load produced by cooling and dehumidification, an inverter 32 connected to a motor 15 driving the compressor 14 is controlled to change the rpm of the motor 15 to effect a change in the amount of refrigerant circulating in the refrigeration cycle. Also, the power energy of the compressor 14 can be saved.

For a change in temperature of condensation cooling in the cooling dehumidifying means 1, a first temperature sensor 21a and a second temperature sensor 21b are used to detect the refrigerant inlet temperature and the refrigerant outlet temperature in the cooling dehumidifying means 1. In order to change the detected temperature to a set temperature, an electronic expansion valve controller 19 applies a control signal to an electronic expansion valve 18 to regulate the degree of valve opening so that the steam pressure of the refrigerant, that is, the evaporation temperature of the refrigerant is changed.

For regulation of temperature and humidity of the supply air, a supply-air temperature sensor 8 placed around a merging duct outlet 39b in the merging duct 39 detects the temperature and a supply-air humidity sensor 6 detects the humidity. The sensors 8 and 6 input respectively the results to a heating means controller 9 and a humidifying means controller 7, so that the temperature is controlled by the amount of electric power passed through a temperature-rise heater 4 and a humidifying heater 5 which are provided respectively in the heating means 2 and the humidifying means 3. The temperature of humidifier water of the humidifying means 3 is measured by a humidifier temperature sensor 25, and a fluid level of the humidifier water is maintained by a humidifier-water control valve 27. Regarding airflow regulation, an inverter 31 connected to a motor 12 driving a supply-air fan 11 is controlled to achieve energy conservation. In addition, an atmospheric pressure sensor 33 is provided on the exterior surface of the air conditioning system to measure the atmospheric pressure at the location where the system is installed. Then, the measurement is applied to the arithmetic means 26 to be used to regulate the airflow when rapid and great variations in weather conditions occur. Such an air conditioning system is described in, for example, JP-A No. 2004-28421.

A first disadvantageous problem of such an air conditioning method using energy-saving type cooling and dehumidifying functions in the related art is to adopt a vapor-pressure control method in which humidity regulation is expressed in simple relative humidity $\phi(\%)$. The $\phi(\%)$ is the percentage of a vapor pressure $p(Pa)$ at this moment with respect to a saturated vapor pressure $Ps(Pa)$ at a temperature $t(°C.)$. For this reason, regulation of the process air to a relative humidity $\phi(\%)$ can be performed simply by controlling the temperature of humidifier water when humidification is performed to provide a vapor pressure $p(Pa)$, in which controlling the amount of process air and the amount of humidifier water is unnecessary. In other words, a disadvantageous problem that the amount of energy required for necessary humidification is not controlled is caused. When the operation of cooling and dehumidifying the process air is performed through control using a relative humidity $\phi(\%)$, that is, a vapor pressure, only controlling the cooling dehumidifying temperature is required, and control of the flow rate of the process air is unnecessary. In other words, there is a disadvantageous problem that the amount of energy required for cooling and dehumidification is not controlled. In this manner, the vapor-pressure control method is incapable of controlling the amount of necessary energy, thus constituting an obstacle to the progression of energy conservation technology.

In addition, instead of the passage of the total amount of process air through the cooling dehumidifying means, an amount of air introduced into the main-stream duct as shown in FIG. 2 is determined, as a guide, as 50% or less of the amount of process air. Because of this, in the bypass method in which the amount of air flowing into the main-stream duct is reduced to pass through the cooling dehumidifying means located in the main-stream duct for the purpose of providing energy savings, the flow ratio between the main stream and the side stream is maintained constant in order to select conditions for obtaining condensed water with reliability, in anticipation of a wide range of variations in relative humidity of the process air. Also, flow-rate control for the process air is unnecessary in the vapor-pressure control method for the humidity regulation. Therefore, a disadvantageous problem arises that energy is consumed in cooling and dehumidifying a larger amount of air than necessary.

In addition, since the cooling dehumidifying means is an evaporator in a normal refrigeration cycle, a large refrigerator is required. This gives rise to a disadvantageous problem of requiring high cost for the air conditioning system needing a large space and a large footprint.

As a result of consuming energy in cooling and dehumidifying a larger amount of air than necessary, this gives rise to a disadvantageous problem that a large amount of energy must be inevitably consumed in heating and humidifying.

Further, because the confluence is located upstream of the heating means 2 as shown in FIG. 2, the heating means 2 and the humidifying means 3 handles the combined amount of air. This gives rise to a disadvantageous problem of requiring high cost for the air conditioning system including the heating means 2 and the humidifying means 3 that need a large space and a large footprint. In particular, when the humidifying means 3 is of a basin type in which water is vaporized from a horizontal plane, a wide horizontal plane is required, leading to an increased footprint, resulting in impossibility of providing a compact system.

Next, the following table 1 shows the state of a change in the absolute humidity X(kg/kg (dry air)) under
(A) a high atmospheric pressure of 1033.5 hPa
(B) a standard atmospheric pressure of 1013.3 hPa at sea level
(C) a low atmospheric pressure of 960.5 hPa,
when the temperature is adjusted to 25° C. and the relative humidity is adjusted to 50%.

TABLE 1

|  | A | B | C |
|---|---|---|---|
| Atmospheric Pressure (hPa) | 1033.5 | 1013.3 | 960.5 |
| Absolute Humidity X(kg/kg (dry air)) | $96.66 \times 10^{-4}$ | $98.82 \times 10^{-4}$ | $104.34 \times 10^{-4}$ |

Although the relative humidity $\phi(\%)$ is not changed, the absolute humidity X decreases under high atmospheric pressure, but the absolute humidity X increases under low atmospheric pressure. It should be understood that, even if the air conditioning system is installed either in the indoors or in the outdoors or is installed either inside a cleanroom or outside a cleanroom, a change in atmospheric pressure affects the process air and the supply air.

The absolute humidity X in Table 1 shows a water content kg included in dry air of 1 kg having no water content under each of the weather conditions. Because of this, disadvantageously, if moisture is regulated by the vapor-pressure control method under a low atmospheric pressure of 960.6 hPa, for example, when a typhoon passes, the humidifier water of $(104.34-98.82) \times 10^{-4} = 5.52 \times 10^{-4}$ kg greater than that under standard atmospheric pressure is required with respect to dry air of 1 kg, while energy of $\{(104.34-98.82) \times 10^{-4}\}$ $(51.33 \times 10^3) = 28.33$ Joul greater than that under standard atmospheric pressure is required.

Many of the production facilities in which such an air conditioning system is installed are located at 50 m to 1000 m of altitude above seal level, so that the atmospheric pressure in the location has a standard value or lower at all times. Because of this, if the vapor-pressure control method is used for water regulations, this gives rise to a disadvantageous problem of the need for a larger amount of humidifier water and a larger amount of humidification energy than it is installed in a location at sea level at all times.

SUMMARY

The present invention has been made in view of the above circumstances and provides an air conditioning method and a compact air conditioning system at low cost which are capable of: adapting to temperature and humidity conditions of process air exhausted from a work area, such as cleanrooms, and to temperature conditions of humidifier water; of regulating the supply air to a predetermined temperature, a predetermined humidity and a predetermined flow rate; of achieving a significant reduction in the consumption of energy which cannot be accomplished by a method of performing humidification by vapor-pressure control after cooling and dehumidifying operation is performed by vapor-pressure control under conditions that a flow ratio between a main stream and a side stream which is commonly used for energy savings is fixed at approximately 1:1 to obtain condensed water with reliability; and of reducing the sizes of cooling dehumidifying means, heating means and humidifying means.

A first aspect of the present invention provides an air conditioning method of regulating temperature and humidity of process air to deliver it as supply air, which can be practiced in an air conditioning system including: measuring means that measures flow rates, pressures, temperatures, relative humidities of the process air and the supply air, a flow rate and a temperature of humidifier water, and an atmospheric pressure; and arithmetic means that receives the measured values from the measuring means and calculates an absolute humidity ($x_1$[g/kg(dry air)]) of the process air, an absolute humidity ($x_2$[g/kg(dry air)]) of the supply air, an amount of the process air, a required amount of cooled-dehumidified air, a required amount of cooling-dehumidification-byproduct water, a required amount of cooled air, and a required amount of humidification.

The air conditioning method of regulating temperature and humidity of process air to deliver it as supply air includes, when the absolute humidity ($x_1$[g/kg(dry air)]) of the process air is higher than the absolute humidity ($x_2$[g/kg(dry air)]) of the supply air, that is, $x_1 \geq x_2$, processes of: causing the required amount of cooled-dehumidified air out of the amount of the process air to flow downstream as a main stream in a main-stream duct in which cooling dehumidifying means, heating means and humidifying means are mounted; and causing the remainder of the amount of the process air, that is, (the amount of process air)−(the required amount of cooled-dehumidified air), to flow downstream as a side stream in a side-stream duct in which regulating means is provided for regulating a flow rate of the process air in the side-stream duct.

The air conditioning method for regulating temperature and humidity of process air to deliver it as supply air, which is provided by a second aspect of the present invention, may include, when the absolute humidity ($x_1$[g/kg(dry air)]) of the process air is lower than the absolute humidity ($x_2$[g/kg(dry air)]) of the supply air, that is, $x_1 < x_2$, processes of: causing the required amount of cooled air out of the amount of the process air to flow downstream in the main-stream duct in which cooling means, the heating means and the humidifying means are mounted; and causing the remainder of the amount of the process air, that is, (the amount of process air)−(the required amount of cooled air), to flow downstream in the side-stream duct in which flow-rate regulating means is provided.

In the air conditioning method for regulating temperature and humidity of process air to deliver it as supply air provided by a third aspect of the present invention, the measuring means may measure a temperature of a merged flow after the main stream of the process air flowing downstream through the main-stream duct and the side stream of the process air flowing downstream through the side-stream duct merge with each other, and the arithmetic means may receive the measured values from the measuring means and calculate a required amount of heating energy for vaporization of the required amount of humidification (liquid), for an increase in temperature of (the required amount of cooled-dehumidified air)−(the required amount of cooling-dehumidification-byproduct water)+(the required amount of humidification (gas)) to a merged-flow temperature selected from the range from a supply-air temperature to 15° C. when $x_1 \geq x_2$, and for an increase in temperature of (the required amount of cooled air)+(the required amount of humidification (gas)) to a merged-flow temperature selected from the range from a supply-air temperature to 15° C. when $x_1 < x_2$. Further, the air conditioning method may include the process of actuating a heating means controller in response to a signal indicative of the required amount of heating energy output from the arithmetic means.

In the air conditioning method for regulating temperature and humidity of process air to deliver it as supply air, a supply-air fan can be provided in the merging duct in which the main stream and the side stream merge with each other downstream of the humidifying means, for regulation of the amount of supply air.

A fourth aspect of the present invention provides an air conditioning system of regulating temperature and humidity of process air to deliver it as supply air, which includes: measuring means that measures flow rates, pressures, temperatures, relative humidities of the process air and the supply air, a flow rate and a temperature of humidifier water, and an atmospheric pressure; and arithmetic means that receives the measured values from the measuring means and calculates an absolute humidity ($x_1$[g/kg(dry air)]) of the process air, an absolute humidity ($x_2$[g/kg(dry air)]) of the supply air, an amount of the process air, a required amount of cooled-dehumidified air, a required amount of cooling-dehumidification-byproduct water, a required amount of cooled air, and a required amount of humidification.

The air conditioning system further includes cooling dehumidifying means, heating means and humidifying means that are placed in a main-stream duct in which the required amount of cooled-dehumidified air out of the amount of the process air flows downstream as a main stream, when the absolute humidity ($x_1$[g/kg(dry air)]) of the process air is higher than the absolute humidity ($x_2$[g/kg(dry air)]) of the supply air, that is, $x_1 \geq x_2$. In addition, flow-rate regulating means is provided in the side-stream duct in which the remainder of the amount of the process air, that is, (the amount of process air)−(the required amount of cooled air), flows downstream as a side stream, for regulating a flow rate of the process air in the side-stream duct.

The air conditioning system provided by a fifth aspect of the present invention may further includes cooling means, the heating means and the humidifying means that are placed in the main-stream duct in which the required amount of cooled air out of the amount of the process air flows downstream as a main stream, when the absolute humidity ($x_1$[g/kg(dry air)]) of the process air is lower than the absolute humidity ($x_2$[g/kg(dry air)]) of the supply air, that is, $x_1 < x_2$. In addition, flow-rate regulating means may be provided in the side-stream duct in which the remainder of the amount of the process air, that is, (the amount of process air)−(the required amount of cooled air), flows downstream as a side stream, for regulating a flow rate of the process air in the side-stream duct.

In the air conditioning system provided by a sixth aspect of the present invention, the measuring means may measure a temperature of a merged flow after the process air flowing downstream through the main-stream duct and the process air flowing downstream through the side-stream duct merge with each other. And, the arithmetic means may receive the measured values from the measuring means and calculate a required amount of heating energy for vaporization of the required amount of humidification (liquid), for an increase in temperature of (the required amount of cooled-dehumidified air)−(the required amount of cooling-dehumidification-byproduct water)+(the required amount of humidification (gas)) to a temperature selected from the range from a supply-air temperature to 15° C. when $x_1 \geq x_2$, and for an increase in temperature of (the required amount of cooled air)+(the required amount of humidification (gas)) to a temperature selected from the range from a supply-air temperature to 15° C. when $x_1 < x_2$. The air conditioning system may include heating means controller that is actuated in response to a signal indicative of the required amount of heating energy output from the arithmetic means.

Further, a supply-air fan can be provided in the merging duct in which the main stream and the side stream merge with each other downstream of the humidifying means, for regulation of the amount of supply air.

[Action]

The measuring means according to the first and fourth aspects is used to measure flow rates, pressures, temperatures, relative humidities of the process air and the supply air, a flow rate and a temperature of humidifier water, and an atmospheric pressure at set time intervals. Because of this, even if conditions of the intake air, namely, the process air, and the supply air are changed/varied by changes/variations in weather conditions and/or work situations in a cleanroom, the calculation values of the amount of process air, the required amount of cooled-dehumidified air, the required amount of cooling-dehumidification-byproduct water, the required amount of cooled air, and the required amount of humidification are updated on all occasions.

Accordingly, output signals indicative of the amount of process air and the required amount of cooled-dehumidified air which are applied to the flow-rate regulating means controller are also updated on all occasions. Likewise, an output signal indicative of the required amount of humidification applied to the humidifying means controller is updated on all occasions.

By using the measuring means according to the first, third, fourth and sixth aspects, update is performed on all occasions on an output signal indicative of the required amount of heating energy which is calculated from the measured values of the temperature of a merged flow after the process air flowing downstream through the main-stream duct and the process air flowing downstream through the side-stream duct merge with each other, the temperature of humidifier water, and the amount of humidification for application to the heating means controller.

Measurement performed by the measuring means, a time interval between outputs of calculated values based on the measured values from the arithmetic means, and input operation are implemented by a method used in commercially available typical hardware for industrial use. Commonly used methods can be employed for the heating means, the controller of the heating means, the humidifying means and the controller of the humidifying means.

FIG. 1 is a schematic diagram illustrating the configuration of an air conditioning system according to an embodiment of the present invention. For the flow-rate regulating means mounted in the side-stream duct, first flow-rate regulating means 43 and second flow-rate regulating means 44, which differ in capability from each other, are placed as illustrated in FIG. 1. The second flow-rate regulating means 44 has the capability of regulating (the amount of process air)−(the required amount of cooled-dehumidified air) or (the amount of process air)−(the required amount of cooled air), which may possibly occur within the operation time period, to a maximum flow rate. On the other hand, the first flow-rate regulating means 43 has the capabilities of securing a maximum flow rate of (the amount of process air)−(the required amount of cooled-dehumidified air) or (the amount of process air)−(the required amount of cooled air), and of accurately regulating the amount of process air, the required amount of cooled-dehumidified air and the required amount of cooled air to accommodate their variations resulting from changes/variations in atmospheric pressure and work situations. In consequence, the required amount of cooled-dehumidified air or the required amount of cooled air flowing downstream in the main-stream duct is sufficiently ensured with reliability, so that the process air is not excessively cooled and/or dehumidified more than necessary, eliminating waste of energy. It follows that the air is not undercooled and/or underdehumidified. The two flow-rate regulating means as described above are not necessarily required to be mounted, and an object of the present invention can be achieved by mounting the first flow-rate regulating means 43 alone capable of accurately regulating to accommodate the variations.

Because a flow-velocity sensor, a temperature sensor and a relative humidity sensor are placed in the vicinity of the duct inlet in each of the main-stream and side-stream ducts, even if the main stream and the side stream differ in temperature and/or humidity from each other, output signals indicative of the amount of process air, the required amount of cooled-dehumidified air, the required amount of cooling-dehumidification-byproduct water, the required amount of cooled air, the required amount of humidification and the required amount of heating energy can be provided at all times by use of the arithmetic means according to an embodiment of the present invention.

[Definitions of the Required Amount of Cooled-Dehumidified Air and the Like]

When the absolute humidity $x_1$ of the process air is greater than the absolute humidity $x_2$ of the supply air, the main stream of the process air is passed through the cooling dehumidifying means. Then, the lower the amount of the air, the lower the amount of energy required for cooling and dehumidifying, resulting in not only energy saving but also provision of a compact and inexpensive system. The inventor of the present application has studied how to reduce the amount of air to be cooled and dehumidified. As a result, the inventor has found the relationship between the relative humidity of the process air and a ratio of the amount of air to be cooled and dehumidified to the amount of process air, as shown in FIG. 3, in which a dehumidification temperature is used as a parameter. Specifically, if variables representing any two of (1) the relative humidity of the process air, (2) a ratio of the amount of air to be cooled and dehumidified to the amount of process air, and (3) the dehumidification temperature are determined, the sole remaining variable is determined. In FIG. 3, if (1) and (3) are determined, the amount of air to be cooled and dehumidified that is calculated from (2) a ratio of the amount of air to be cooled and dehumidified to the amount of process air results in the amount of air to be cooled and dehumidified at a minimum flow rate. Further, when this main stream merges with the remainder of the process air which is the side stream, the amount of water in the process air becomes equal to the amount of water required by the supply air, resulting in unnecessity of humidification. The amount of air to be cooled and dehumidified at this time is referred to as a limit amount of cooled-dehumidified air. FIG. 3 shows the state under the conditions that atmospheric pressure is a standard atmospheric pressure (=1013 hpa), the supply air is of a temperature of 23° C. and a humidity of 45%, and the process air is of a temperature of 27° C. It should be understood that necessary relational expressions are stored in the arithmetic means and a limit amount of cooled air under different conditions can be easily made.

A further description will be given with reference to FIG. 3. For example, if the process air of a temperature of 27° C. and a relative humidity of 42% is cooled for cooling dehumidification at a dehumidification temperature of 5° C. (shown by point a), a limit amount of cooled-dehumidified air flowing downstream in the main-stream duct is 0.375 in the ratio to the amount of process air, that is, 37.5%. If the cooling dehumidification is performed at a dehumidification temperature of 4° C. (shown by point b), a limit amount of cooled-dehumidified air is 34.5% of the amount of process air. If the cooling dehumidification is performed at a dehumidification temperature of 6° C. (shown by point c), a limit amount of cooled-dehumidified air is 42.0% of the amount of process air. This example cannot be compared directly with the commonly used bypass method described earlier because a limit amount of cooled-dehumidified air is not determined in the bypass method. However, since a ratio of the amount of air to be cooled and dehumidified to the amount of process air is 0.5, 0.375 determined when the dehumidification temperature is 5° C. becomes equal to 75.0% of 0.5, so that the amount of process air to be cooled and dehumidified can be reduced by 25%, resulting in a significant reduction in the amount of dehumidification energy. The temperature and the humidity of the air exhausted from a work area such as a cleanroom which is taken in as process air are changed/varied by work situations in the cleanroom. Also, atmospheric pressure is changed/varied. If the limit amount of cooled-dehumidified air shown in FIG. 3 is maintained and the process air is cooled and dehumidified without consideration of those changes/variations, the relative humidity in the supply air may be too high or be insufficient. Therefore, in an embodiment of the present invention, the amount of air to be cooled and dehumidified which is 3% to 5% larger than the limit amount of cooled-dehumidified air given in FIG. 3 in order to accommodate such changes/variations is defined as the required amount of cooled-dehumidified air to flow downstream through the main-stream duct. The amount of removed water by passing the air through the cooling dehumidifying means is the required amount of cooling-dehumidification-byproduct water, and the amount of water to be added by the humidifying means is the required amount of humidification.

[Definitions of the Required Amount of Cooled Air and the Like]

The inventor of the present application has considered the case where the absolute humidity $x_1$ of the process air is less than the absolute humidity $x_2$ of the supply air, and found a method of causing the required amount of cooled air which is determined as one-half to one-third of the amount of process air to flow downstream through the cooling means located in the main-stream duct in order to cool the process air to its dew point plus 1° C. to 2° C. As a result, the amount of air to be cooled that flows into the cooling means can be significantly reduced. Also, because the process air is cooled to its dew point plus 1° C. to 2° C. at which the water in the process air is not condensed, condensing energy is unnecessary, resulting in significant reduction in the amount of cooling energy.

In the air conditioning method according to an embodiment of the present invention, changes/variations in atmospheric pressure, changes/variations in temperature of air expelled from a cleanroom and recycled for use, and changes/variations in relative humidity are measured to calculate the amount of air to be cooled and dehumidified, the amount of air to be cooled, the amount of cooling energy and the amount of dehumidification energy. After that, the controller of the flow-rate regulating means is activated. This makes it possible to reduce an excessive amount of cooled-dehumidified air in the related art to a required amount of cooled-dehumidified air, and to reduce an excessive amount of cooled air in the related art to a required amount of cooled air, thus achieving substantial energy savings to contribute to improved global environment.

Accordingly, because the air conditioning method according to the embodiment of the present invention provides reductions to the required amount of cooled-dehumidified air and the required amount of cooled air as described in the above paragraph, this makes it possible to reduce an excessive amount of heating energy in the related art to a required amount of heating energy, and to reduce the amount of humidification to a required amount of humidification, thus achieving substantial energy savings to contribute to improved global environment. Further, the air conditioning method can contribute to a reduction in manufacturing costs of products manufactured in work areas, which also applies to the above paragraph.

In an embodiment of the present invention, because the amount of cooled-dehumidified air and the amount of cooled air are reduced respectively to the required amount of cooled-dehumidified air and the required amount of cooled air, the cooling dehumidifying means applies and receives the amount of cooling energy and the amount of dehumidification energy can be designed to be compact. The heating means and the humidifying means can be also designed to be compact. Because of this, the diameter of the main-stream duct becomes smaller than that of the side-stream duct. In consequence, the air conditioning system including those compact components has a reduced footprint and is provided at low cost, having a great economic effect of reducing the manufacturing costs of products.

According to an embodiment of the present invention, because the flow-velocity sensor, the temperature sensor and the relative humidity sensor are mounted in each of the main-stream and side-stream ducts, and also the flow-rate regulating means is mounted in the side-stream duct, the required amount of cooled-dehumidified air or the required amount of cooled air flowing downstream through the main-stream duct can be ensured for manufacturing operation. The remainder of the amount of process air flowing downstream through the side-stream duct is also ensured.

In addition, according to an embodiment of the present invention, because the temperature of a merged flow after the main stream of the process air flowing downstream through the main-stream duct has merged with the side stream of the process air flowing downstream through the side-stream duct is increased to a merged-flow temperature selected from the range from the temperature of the supply air to 15° C., even if the temperature of the air passing through the fan is increased by the heat produced by the fan, a supply of air at a predetermined supply-air temperature, for example, at 23° C. is made possible. Note that the temperature 15° C. is determined as a merged-flow temperature when the main stream and the side stream of the process air of 27° C. merge with each other in around a 1:1 ratio and the heating means is not operated.

According to an embodiment of the present invention, air flows flowing at different flow rates, at different temperatures and at different relative humidities downstream through the main-stream duct and the side-stream duct merge with each other from two directions to form an air flow of a predetermined temperature and a predetermined relative humidity. The supply-air fan located in the merging duct can deliver the airflow after further regulating it to a predetermined flow rate and static pressure required at the use point.

BRIEF DESCRIPTION OF THE DRAWINGS

Embodiments of the present invention will be described in detail based on the following drawings, wherein.

DETAILED DESCRIPTION

Figure 1:
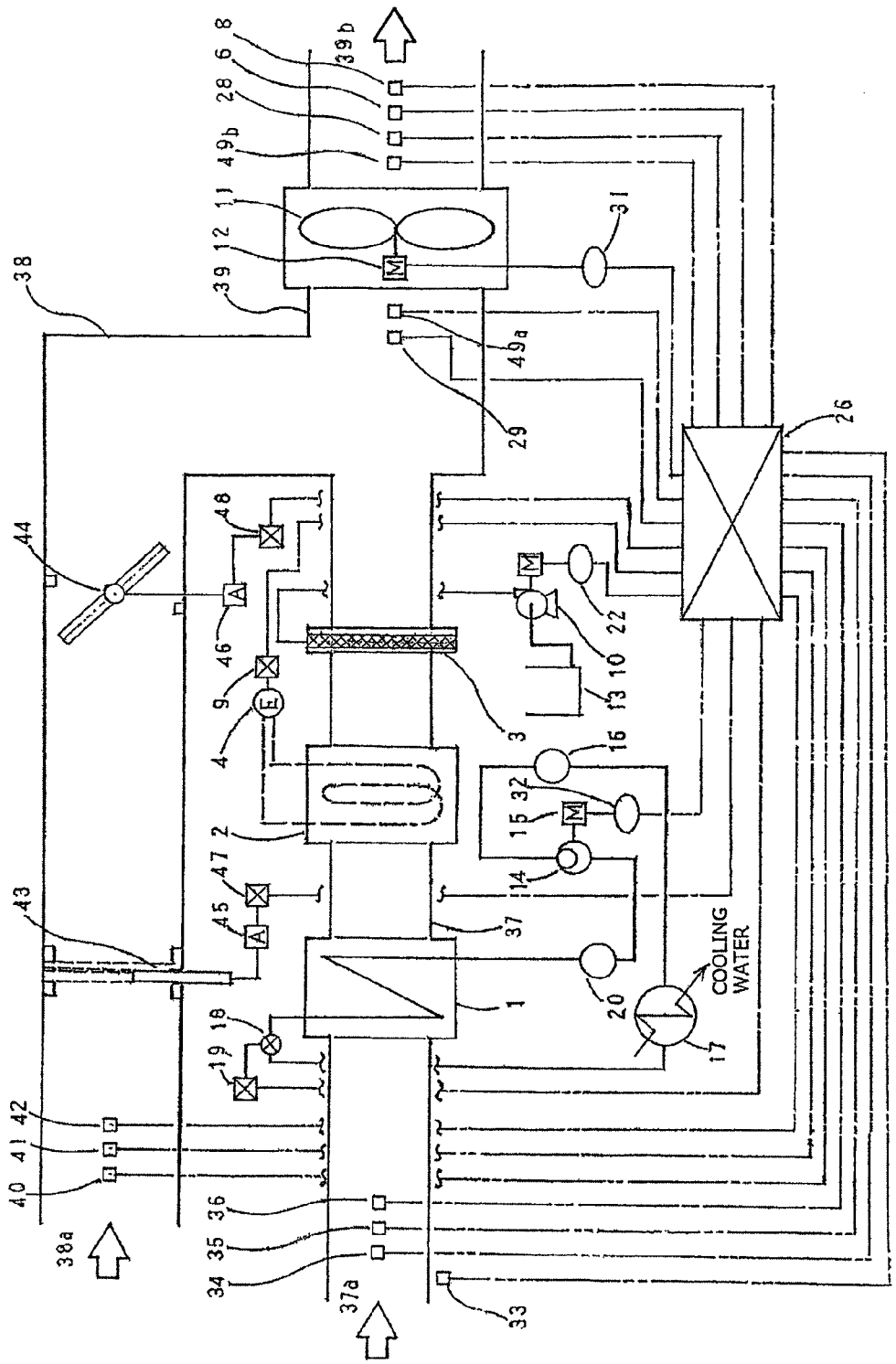
FIG. 1 is a diagram illustrating the configuration of an air conditioning system according to an embodiment of the present invention.

An embodiment according to the present invention will be described below with reference to the accompanying drawings. FIG. 1 is a diagram illustrating the configuration of an air conditioning system according to an embodiment of the present invention. In FIG. 1, the main stream of process air, which is exhausted from a cleanroom or a clean booth, is taken in through a main-stream duct inlet 37a and a side stream of the process air is taken in through a side-stream duct inlet 38a. The main stream flowing downstream along the main-stream duct passes through a process-air flow velocity sensor 34, a process-air temperature sensor 35 and a process-air relative humidity sensor 36 before flowing into cooling dehumidifying means 1. The sensors 34, 35 and 36 measure respectively the flow velocity or flow rate, the temperature and the relative humidity of the in-taken main stream of the process air. Concurrently, the side stream flowing downstream along the side-stream duct passes through a side-stream flow velocity sensor 40, a side-stream temperature sensor 41 and a side-stream relative humidity sensor 42 before flowing into first flow-rate regulating means 43. The sensors 40, 41 and 42 measure respectively the flow velocity or flow rate, the temperature and the relative humidity of the in-taken side stream of the process air. The first flow-rate regulating means 43 is equipped with a first flow-rate regulating means actuator 45 and a first flow-rate regulating means controller 47, while the second flow-rate regulating means 44 is equipped with a second flow-rate regulating means actuator 46 and a second flow-rate regulating means controller 48, so that the first flow-rate regulating means 43 and the second flow-rate regulating means 44 are capable of regulating independently the flow rate.

On the other hand, when the supply air flows from the confluence of the main stream and the side stream through a fan 11 to a merging duct outlet 39b in a merging duct 39, a first pressure sensor 49a, a second pressure sensor 49b, a supply-air temperature sensor 8, a supply-air relative humidity sensor 6, and a supply-air flow-velocity sensor 28, which are located in the merging duct 39, measure respectively the total pressure and/or static pressure, the temperature, the relative humidity and the flow rate of the supply air, and then input the measurements to arithmetic means 26. Also, an atmospheric pressure sensor 33 is mounted on the outer surface of the air conditioning system to measure the atmospheric pressure in a location where the air conditioning system is installed, and inputs the measurement to the arithmetic means 26.

A refrigerant evaporator in a refrigeration cycle is applied to the cooling dehumidifying means 1 when $X_1 \geq X_2$ or to the cooling means 1 when $X_1 < X_2$. By doing so, in the air conditioning system according to the embodiment of the present invention, the refrigeration cycle is made up of a compressor 14, an oil separator 16, a condenser 17, an electronic expansion valve 18 and an accumulator 20 that are interconnected by pipes to circulate the refrigerant. The cooling dehumidifying means 1 is placed in the vicinity of the main-stream duct inlet 37a and housed in the main-stream duct 37. Heating means 2, a temperature-rise heater 4 and humidifying means 3 are also housed in the main-stream duct 37 and placed downstream of the cooling dehumidifying means 1.

Figure 2:
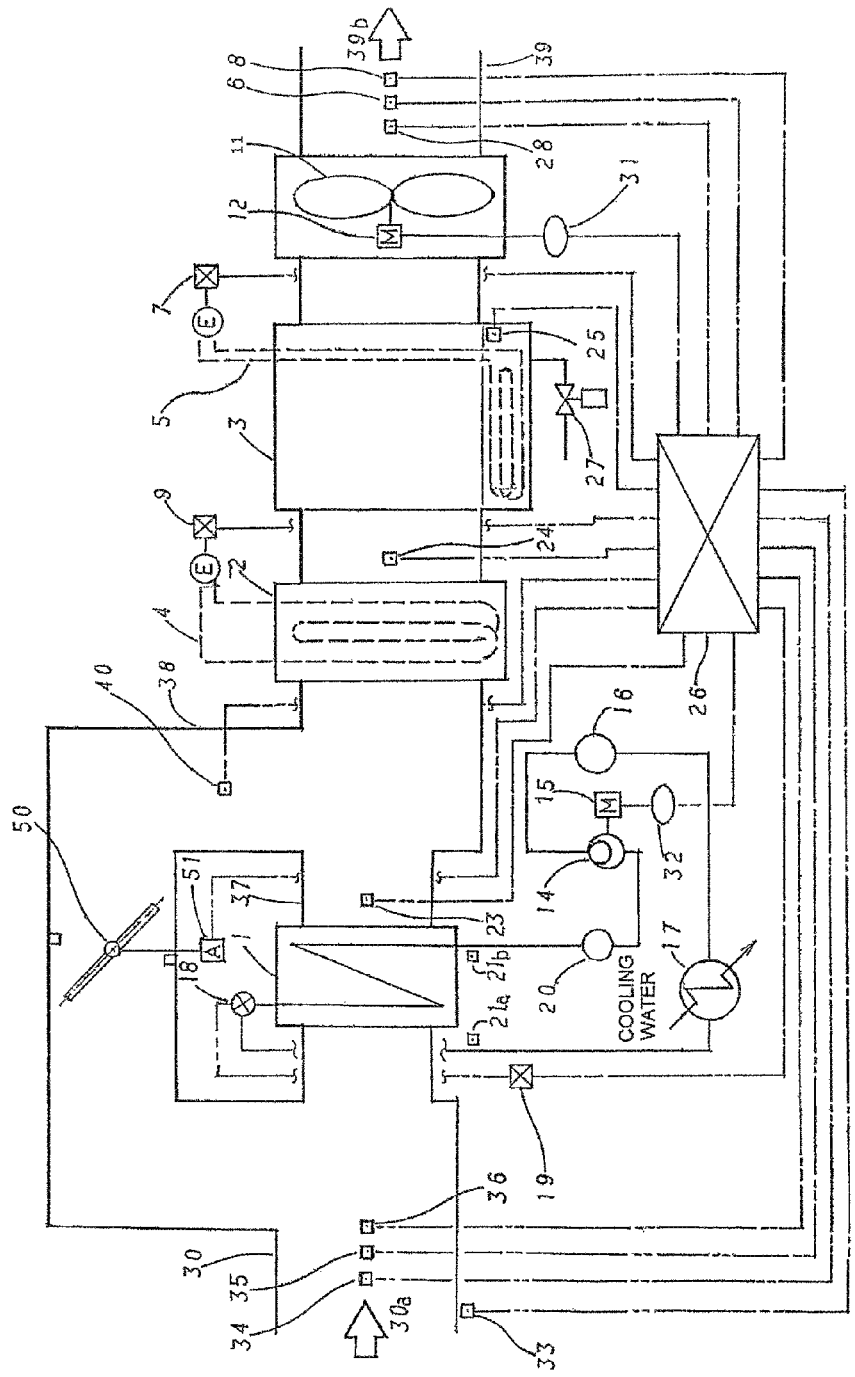
FIG. 2 is a diagram illustrating the configuration of an example of the air conditioning systems in the related art.
Figure 3:
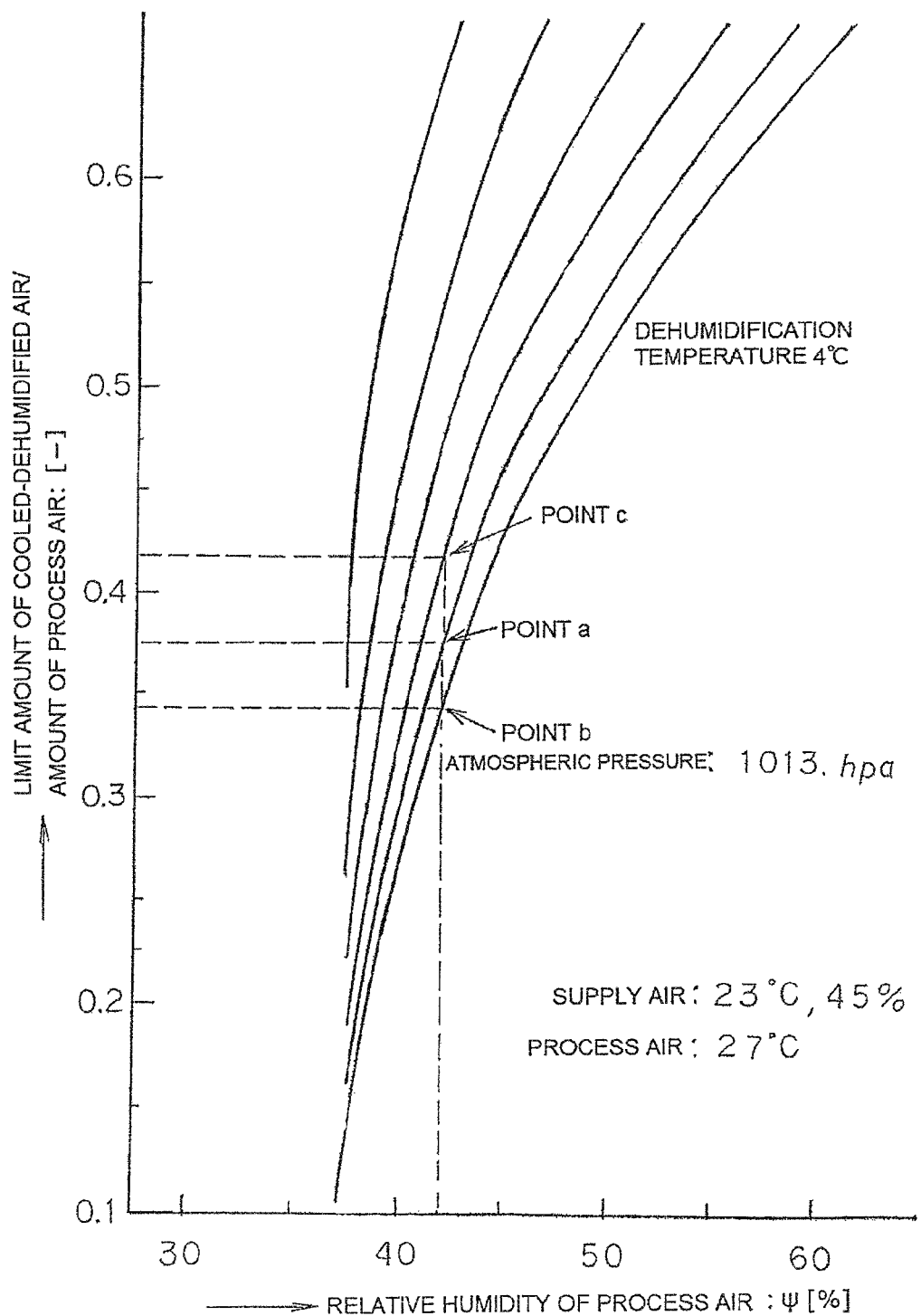
FIG. 3 is a chart showing the relationship among the relative humidity of the process air, a ratio of the limit amount of cooled-dehumidified air to the amount of the process air, and the dehumidification temperature.

The main stream of the process air flowing out from the cooling dehumidifying means 1 or the cooling means 1 illustrated in FIG. 1 flows into the heating means 2. A merged-flow temperature sensor 29 is provided in the merging duct 39 formed by joining together the main-stream duct 37 and the side-stream duct 38. The arithmetic means 26 receives the merged-flow temperature measured by the merged-flow temperature sensor 29, the humidifier water temperature, and the amount of humidification, and calculates the amount of heat required to vaporize the required amount of humidifier water (liquid), and thermal energy, that is, the amount of heating energy required to increase the temperature of (the required amount of cooled-dehumidified air)−(the required amount of cooling-dehumidification-byproduct water)+(the required amount of humidifier water (gas)) to a merged-flow temperature selected from the range from the supply air temperature to 15° C. The heating means 2 is equipped with a heating means controller 9 that receives a signal indicative of the required amount of heating energy from the arithmetic means 26 and actuates the temperature-rise heater 4. The humidifying means 3 includes a main body, a humidifier water tank 13 and a humidifier water pump 10. The main body of the humidifying means 3 is an assembly including metal-, glass- or resin-made fiber folded into the mat shape and formed to be identical in section with the main-stream duct 37. The humidifier water is dripped or sprayed from an upper portion of the assembly so that, while falling inside the assembly, the water is vaporized by the process air flowing through the assembly and having the required amount of heating energy applied by the heating means 2. Because of a small amount of dripped or sprayed humidification as described earlier, each of the humidifier water tank 13 and the humidifier water pump 10 has a smaller footprint. The footprint of the evaporation mat illustrated in FIG. 1 is significantly smaller than that of the basin-type humidifying means 3 illustrated in FIG. 2. The need of the humidifying heater in FIG. 2 is eliminated, leading to a reduction in component count. Note that the amount of humidification is controlled by outputting a signal indicative of the required amount of humidification to actuate a humidifying-means controller 22.

The main stream of the process air flowing out from the humidifying means 3 reaches the place to meet the side stream of the process air and then flows into the merging duct 39. The merged-flow temperature sensor 29 measures the temperature of the merged flow. Then, the merged air flow enters the supply-air fan 11 so as to be regulated to an amount of supply air required at a use point. For this regulation, a method using the total pressure or static pressure of the supply-air fan 11 and the rpm of a fan motor 12 is adopted. The rpm of the fan motor 12 is controlled by a fan-motor inverter 31. The total pressure or static pressure of the supply-air fan 11 is calculated by a first pressure sensor 49a and a second pressure sensor 49b, and the amount of supply air is calculated by the supply-air flow-velocity sensor 28. In the area downstream from the supply-air fan 11, a measured value of the supply-air temperature sensor 8 is inevitably 2° C. to 5° C. higher than the measured value of the merged-flow temperature sensor 29 because of heat of adiabatic compression mainly generated by pressurizing the supply air. To address it, in the embodiment of the present invention, a rise in temperature is measured before bringing the system into practical operation and the measured value is stored in the arithmetic means 26. By doing so, the setting of a merged-flow temperature to one selected from the range from a supply air temperature to 15° C. is made possible. For example, when the supply-air temperature is 23° C. and the supply-air fan 11 has a 5° C. rise in temperature, the setting to 18° C. within the range from the supply-air temperature of 23° C. to 15° C. is possible. Then, the heating-means controller 9 is actuated so that the temperature measured at the merged-flow temperature sensor 29 becomes 18° C. Therefore, even when the supply-air fan 11 generates heat, the supply air is regulated to a predetermined temperature for a supply to the use point.

What is claimed is:

1. An air conditioning method of regulating temperature and humidity of process air to deliver it as supply air, the air conditioning method comprising:

in an air conditioning system including:
measuring equipment that measures flow rates, pressures, temperatures, relative humidities of the process air and the supply air, a flow rate and a temperature of humidifier water, and an atmospheric pressure; and
an arithmetic unit that receives first measured values from the measuring equipment and calculates an absolute humidity $x_1$ of the process air, an absolute humidity $x_2$ of the supply air, an amount of the process air, a required amount of cooled-dehumidified air that corresponds to an amount of air that is required for cooling and dehumidifying out of the amount of the process air, a required amount of cooling-dehumidification-byproduct water that corresponds to an amount of water that is to be removed by cooling and dehumidifying, a required amount of cooled air that corresponds to an amount of air that is required for cooling out of the amount of the process air, and a required amount of humidification that corresponds to an amount of water that is to be added by humidifying,
the arithmetic unit previously storing relationship among the relative humidity of the process air, a ratio of a limit amount of cooled-dehumidified air that indicates the amount of air to be cooled and dehumidified at a minimum flow rate to the amount of the process air, and a dehumidification temperature, and calculating the required amount of cooled-dehumidified air based on the previously stored relationship and the first measured values from the measuring equipment,
when the absolute humidity $x_1$ of the process air is higher than the absolute humidity $x_2$ of the supply air, that is, $x_1 \geq x_2$,
causing the required amount of cooled-dehumidified air calculated by the arithmetic unit out of the amount of the process air to flow downstream as a main stream in a main-stream duct in which a cooling dehumidifying unit, a heater and a humidifier are mounted; and
causing the remainder of the amount of the process air, wherein the remainder of the amount of the process air is the amount of process air minus the required amount of cooled-dehumidified air, to flow downstream as a side stream in a side-stream duct in which a regulator is provided for regulating a flow rate of the process air in the side-stream duct, and
when the absolute humidity $x_1$ of the process air is lower than the absolute humidity $x_2$ of the supply air, that is, $x_1 < x_2$,
causing the required amount of cooled air out of the amount of the process air to flow downstream as a main stream in the main-stream duct in which a cooling unit, the heater and the humidifier are mounted; and
causing the remainder of the amount of the process air, wherein the remainder of the amount of the process air is the amount of process air minus the required amount of cooled air, to flow downstream as a side stream in the side-stream duct in which a flow-rate regulator is provided for regulating a flow rate of the process air in the side-stream duct.

2. The air conditioning method for regulating temperature and humidity of process air to deliver it as supply air, according to claim 1,
in the air conditioning system including:
the measuring equipment that measures a temperature of a merged flow after the process air flowing downstream through the main-stream duct and the process air flowing downstream through the side-stream duct merge with each other; and
the arithmetic unit that receives second measured values from the measuring equipment and calculates a required amount of heating energy for vaporization of the required amount of humidification as liquid, for an increase in temperature of (the required amount of cooled-dehumidified air)−(the required amount of cooling-dehumidification-byproduct-water)+(the required amount of humidification as gas) to a merged-flow temperature previously set in a range from a supply-air temperature indicated by the second measured values from the measuring equipment to 15° C. when $x_1 \geq x_2$, and for an increase in temperature of (the required amount of cooled air) +(the required amount of humidification as gas) to a merged-flow temperature previously set in a range from a supply-air temperature indicated by the second measured values from the measuring equipment to 15° C. when $x_1 < x_2$,
the air conditioning method further comprising:
actuating a heater controller in response to a signal indicative of the required amount of heating energy output from the arithmetic unit.

3. An air conditioning system of regulating temperature and humidity of process air to deliver it as supply air, the air conditioning system comprising:
measuring equipment that measures flow rates, pressures, temperatures, relative humidities of the process air and the supply air, a flow rate and a temperature of humidifier water, and an atmospheric pressure;
an arithmetic unit that receives first measured values from the measuring equipment and calculates an absolute humidity $x_1$ of the process air, an absolute humidity $x_2$ of the supply air, an amount of the process air, a required amount of cooled-dehumidified air that corresponds to an amount of air that is required for cooling and dehumidifying out of the amount of the process air, a required amount of cooling-dehumidification-byproduct water that corresponds to an amount of water that is to be removed by cooling and dehumidifying, a required amount of cooled air that corresponds to an amount of air that is required for cooling out of the amount of the process air, and a required amount of humidification that corresponds to an amount of water that is to be added by humidifying,
the arithmetic unit previously storing relationship among the relative humidity of the process air, a ratio of a limit amount of cooled-dehumidified air that indicates the amount of air to be cooled and dehumidified at a minimum flow rate to the amount of the process air, and a dehumidification temperature, and calculating the required amount of cooled-dehumidified air based on the previously stored relationship and the first measured values from the measuring equipment;

a cooling dehumidifying unit that is placed in a main-stream duct in which the required amount of cooled-dehumidified air calculated by the arithmetic unit out of the amount of the process air flows downstream as a main stream, when the absolute humidity $x_1$ of the process air is higher than the absolute humidity $x_2$ of the supply air, that is, $x_1 \geq x_2$ a heater placed in the main-stream duct;

a humidifier placed in the main-stream duct; and a flow-rate regulator that is provided in the side-stream duct in which the remainder of the amount of the process air, wherein the remainder of the amount of the process air is the amount of process air minus the required amount of cooled-dehumidified air, flows downstream as a side stream, for regulating a flow rate of the process air in the side-stream duct;

a cooling unit that is placed in the main-stream duct in which the required amount of cooled air out of the amount of the process air flows downstream as a main stream, when the absolute humidity $x_1$ of the process air is lower than the absolute humidity $x_2$ of the supply air, that is, $x_1 < x_2$ the heater placed in the main-stream duct;

the humidifier placed in the main-stream duct; and a flow-rate regulator that is provided in the side-stream duct in which the remainder of the amount of the process air, wherein the remainder of the amount of the process air is the amount of process air minus the required amount of cooled air, flows downstream as a side-stream, for regulating a flow rate of the process air in the side-stream duct.

4. The air conditioning system for regulating temperature and humidity of process air to deliver it as supply air, according to claim 3, including:

the measuring equipment that measures a temperature of a merged flow after the process air flowing downstream through the main-stream duct and the process air flowing downstream through the side-stream duct merge with each other; and the arithmetic unit that receives second measured values from the measuring equipment and calculates a required amount of heating energy for vaporization of the required amount of humidification as liquid, for an increase in temperature of (the required amount of cooled-dehumidified air) −(the required amount of cooling-dehumidification-byproduct water)+(the required amount of humidification as gas) to a merged-flow temperature previously set in a range from a supply-air temperature indicated by the second measured values from the measuring equipment to 15° C. when $x_1 \geq x_2$, and for an increase in temperature of (the required amount of cooled air) +(the required amount of humidification as gas) to a merged-flow temperature previously set in a range from a supply-air temperature indicated by the second measured values from the measuring equipment to 15° C. when $x_1 < x_2$, the air conditioning system further comprising:

a heater controller that is actuated in response to a signal indicative of the required amount of heating energy output from the arithmetic unit.

* * * * *